(12) United States Patent
Hebenstreit

(10) Patent No.: US 6,328,315 B1
(45) Date of Patent: Dec. 11, 2001

(54) SEALING ARRANGEMENT

(75) Inventor: Axel Hebenstreit, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/459,465

(22) Filed: Dec. 13, 1999

(30) Foreign Application Priority Data

Dec. 12, 1998 (DE) .............................. 198 57 392

(51) Int. Cl.⁷ .............................. F16J 15/52; B62D 5/10; B62D 7/20
(52) U.S. Cl. .......................... 277/634; 277/635; 277/636; 180/78; 280/93.511
(58) Field of Search .................................. 277/634, 635, 277/636; 180/78; 280/93.511

(56) References Cited

U.S. PATENT DOCUMENTS

| 1,885,121 | * | 11/1932 | Loweke . |
| 3,381,987 | * | 5/1968 | Husen . |
| 4,019,612 | * | 4/1977 | Mathews et al. . |
| 4,664,393 | * | 5/1987 | Hazebrook . |
| 4,754,854 | * | 7/1988 | Adachi et al. . |
| 4,840,386 | * | 6/1989 | Peitsmeier et al. . |
| 5,007,881 | * | 4/1991 | Hazebrook . |
| 5,190,125 | * | 3/1993 | Suzuki et al. . |
| 5,346,431 | * | 9/1994 | Okuyama et al. . |
| 5,426,993 | * | 6/1995 | Bodo . |
| 6,056,297 | * | 5/2000 | Harkrader et al. . |

FOREIGN PATENT DOCUMENTS

| 2932317 C2 | 2/1981 | (DE) . |
| 4221669 A1 | 1/1994 | (DE) . |
| G 9405633.1 U1 | 7/1994 | (DE) . |
| 4344385 A1 | 6/1995 | (DE) . |
| 2 251 039 | 6/1992 | (GB) . |

* cited by examiner

Primary Examiner—Anthony Knight
Assistant Examiner—Vishal Patel
(74) Attorney, Agent, or Firm—Crowell & Moring LLP

(57) ABSTRACT

A sealing arrangement for a rotatable shaft guided through an opening and having a profiled surface section includes an elastic cuff mounted at the opening and surrounding the shaft. The cuff abuts the shaft through a supporting ring. An elastic sealing jacket is connected internally with the supporting ring, thereby mounting the elastic sealing jacket non-rotatably on the shaft. The supporting ring has an external cylindrical sliding surface on which the elastic cuff is mounted.

16 Claims, 4 Drawing Sheets

SEALING ARRANGEMENT

BACKGROUND AND SUMMARY OF INVENTION

This application claims the priority of German Patent Document 198 57 392.8 filed Dec. 12, 1998, the disclosure of which is expressly incorporated by reference herein.

The present invention relates to a sealing arrangement for a shaft guided through an opening, especially a wall opening in a motor vehicle. The shaft is mounted rotatably relative to the opening and has a profiled surface section with an elastic cuff mounted at the opening and enclosing the shaft. The cuff abuts the shaft through a supporting ring.

A seal for a shaft guided through a wall opening is known from DE 29 32 317 C2. The seal has a disk-shaped sealing element connected non-rotatably with the shaft. The disk-shaped sealing element is accommodated in a double-walled receiving chamber located at the wall opening. The sealing element has sliding and/or sealing surfaces located endwise that are in intimate contact with the interior of the receiving chamber. The size of the sealing element is chosen so that the sealing element and the wall opening overlap completely in every angular position of the shaft. The shaft can be mounted eccentrically with respect to the wall opening.

A sealing element for passing the steering column of a motor vehicle through a wall opening is known from utility model DE 94 05 633 U1. This element has a sealing body secured at the wall opening into which a bushing is inserted by which the steering column is guided.

A covering unit for a wall opening in a motor vehicle is provided in Offenlegungsschrift DE 42 21 669 A1 through which a steering column is guided. The covering unit consists primarily of a first cover plate into which a sealing and guide bushing for the steering column is integrated and which is mounted on the wall opening from one side such that the guide bushing passes through the wall opening. A matching plate is placed on the wall opening from the other side and latched to the guide bushing.

A sealing arrangement for a steering column of a motor vehicle guided through a wall opening is known from Offenlegungsschrift DE 43 44 385 A1. The arrangement comprises a sealing lip surrounding the wall opening and a holding part holding the arrangement. The holding part as well as the sealing lip made in the form of a hollow bead are mounted on a jacket tube of the steering column.

The goal of the present invention is to provide a sealing arrangement that permits especially good sealing of a wall opening and that can be used with shafts having a surface portion of any desired profile.

This goal is achieved according to the present invention by virtue of the fact that an elastic sealing jacket is associated internally with a supporting ring, by means of which the jacket is mounted nonrotatably on a shaft. The supporting ring has an external cylindrical sliding surface on which an elastic cuff is mounted. The sealing jacket is flexible and elastically deformable so that it adapts to the profile of the surface portion of the shaft and surrounds the shaft in a sealing fashion. The supporting ring presses the sealing jacket in a self-locking manner against the shaft and provides an external surface on which the cuff can slide when the shaft rotates. For this purpose, the supporting ring has a slight dimensional tolerance relative to roundness and good sliding properties at its outer surface. With the proposed arrangement, both a good seal at the opening traversed by the shaft and compensation of dimensional tolerances of the shaft can be achieved. With the aid of the proposed sealing arrangement, shafts that are out-of-round (not precisely round) can be sealed as well.

In the embodiment of the present invention, the supporting ring has (1) a clamping ring section that can be spread apart elastically at least areawise, with which section the elastic sealing jacket is associated; and (2) a sliding ring section having a cylindrical sliding surface that can be connected releasably with the clamping ring section. The clamping ring section can be compressed elastically in its elastically spreadable area so that the sliding ring section can be pushed onto the clamping ring section and tensioned radially. The sealing jacket can be pressed against the shaft by a section that corresponds to the elastically spreadable area of the clamping ring section.

In another embodiment of the present invention, the clamping ring section, especially in its elastically spreadable area, can be provided with one or more lengthwise slots. As a result, an especially high degree of reversible deformation of the clamping ring section can be achieved.

In another embodiment of the present invention, the sealing jacket is permanently connected to the clamping ring section and has an internal constriction in a section that corresponds with the elastically spreadable area of the clamping ring section. The sealing jacket, preferably made of an elastomeric plastic, is connected materialwise (especially by gluing, welding, or injection molding) with the clamping ring section. The constriction is produced by a preferably spherical or conically tapered internal surface. Preferably, the wall thickness of the sealing jacket is greater in this area. When the unit composed of the sealing jacket and the clamping ring section is pushed onto the shaft, both elements are stretched elastically so that they automatically clamp on the shaft.

In another embodiment of the present invention, the clamping ring section, especially in its elastically spreadable area, has a conical outer contour and the sliding ring section, especially in an area that corresponds to the elastically spreadable area of the clamping ring section, has a conical internal contour that matches the outside contour of the clamping ring section. This produces a self-locking frictional clamping connection along a diagonal conical surface that permits equalizing the tolerance depending on the axial length of the clamping ring and sliding ring sections that are pushed on.

In another embodiment of the present invention, latching elements that fit into one another, especially matching teeth, are located between the sliding ring section and the clamping ring section. This produces a simple, reliable latching connection.

In another embodiment of the present invention, the sliding ring section has an internal thread and the clamping ring section has a matching external thread. As a result, an especially reliable screw connection is produced. The sections of the thread produce latching elements in the axial direction.

In another embodiment of the present invention, the clamping ring section has a rigid annular flange. The radially projecting flange serves to stiffen the clamping ring section and acts as a stop surface for the sliding ring section that is slid on.

Other objects, advantages and novel features of the present invention will become apparent from the following detailed description of the invention when considered in conjunction with the accompanying drawings.

DETAILED DESCRIPTION OF THE DRAWINGS

Figure 1:
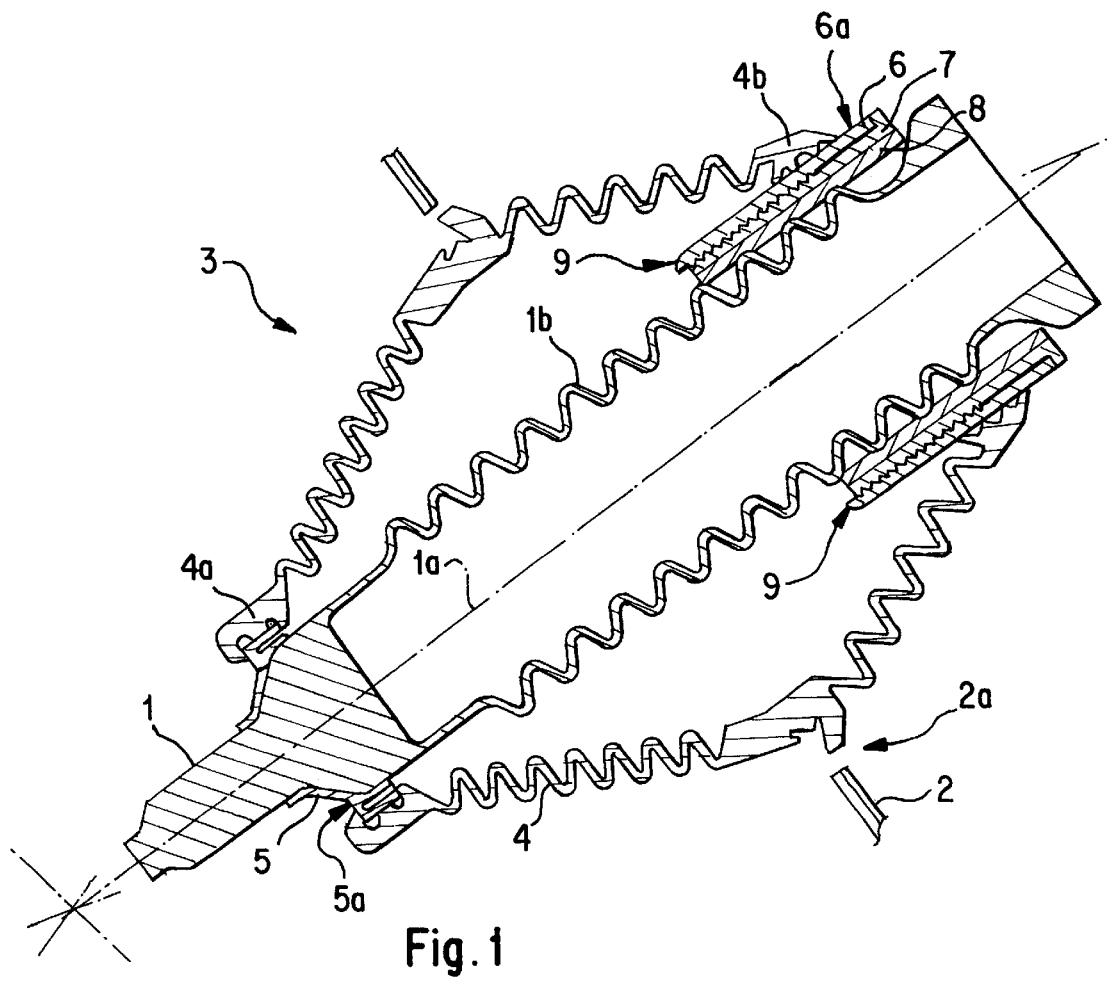
FIG. 1 shows, in a schematic cross sectional view, a steering column of an automobile guided through a wall opening, with a sealing arrangement according to the present invention to seal the wall opening.

FIG. 1 shows a lengthwise spindle 1 of an automobile that is guided through a transverse wall 2 between the engine compartment and the passenger compartment. For this purpose, transverse wall 2 has an opening 2a that is closed off by a sealing arrangement 3 according to the present invention.

Steering column shaft 1 contains a section 1b designed as a corrugated tube that, as a result of its corrugation, has an outer surface that is profiled in the circumferential direction of steering column shaft 1. Steering column shaft 1 is rotatably mounted on its main axis 1a in a manner not shown and is surrounded by a cuff in the form of a bellows 4 that forms a significant portion of sealing arrangement 3. The bellows are attached non-rotatably with transverse wall 2. Bellows 4 preferably consists of a plastic with good elastic deformability or of rubber and is flexibly supported at its end areas 4a and 4b on sliding surfaces 5a and 6a facing the shaft. For this purpose, annular sealing lips are provided in end areas 4a and 4b, not shown in greater detail, at which sliding surfaces 5a and 6a slide. Sliding surface 5a is located on the outside of a guide ring 5 that is mounted nonrotatably on steering column shaft 1. Sliding surface 6a is located on the outside of a sealing unit 9 that is constructed as follows.

Figure 3:
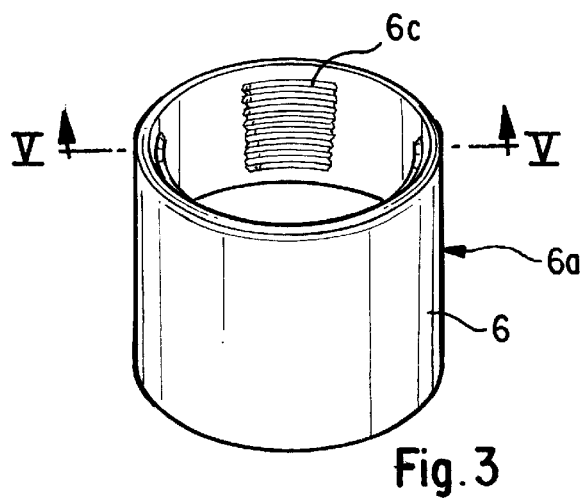
FIG. 3, in a perspective view, shows a sliding ring of the sealing arrangement according to FIG. 1.
Figure 5:
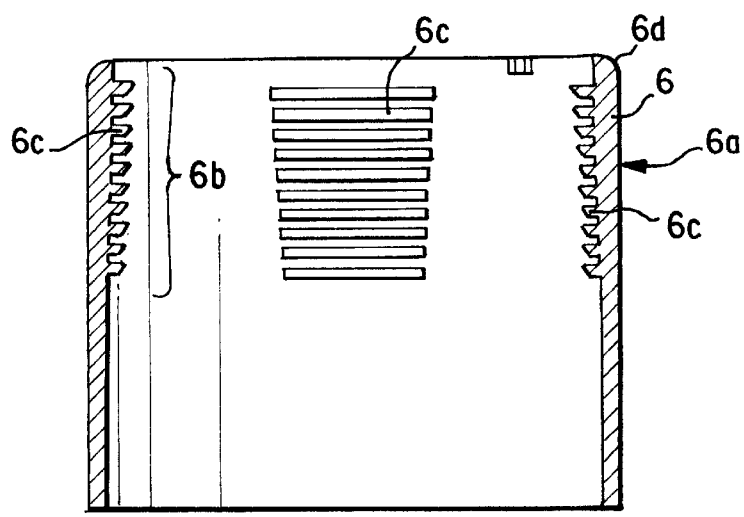
FIG. 5, in a cross section along line V—V, shows the sliding ring according to FIG. 3.
Figure 6A:
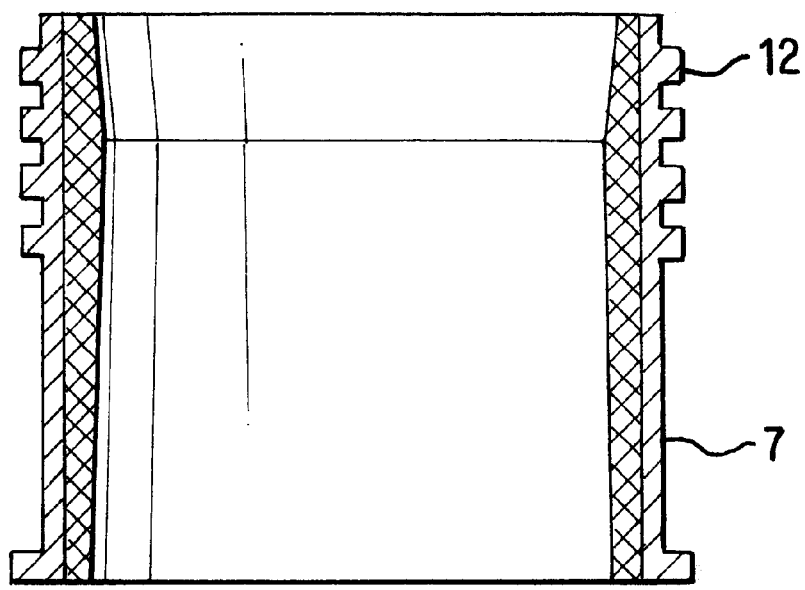
FIGS. 6a–6b, in a cross section view, show latching elements in a sealing arrangement according to the present invention.
Figure 6B:
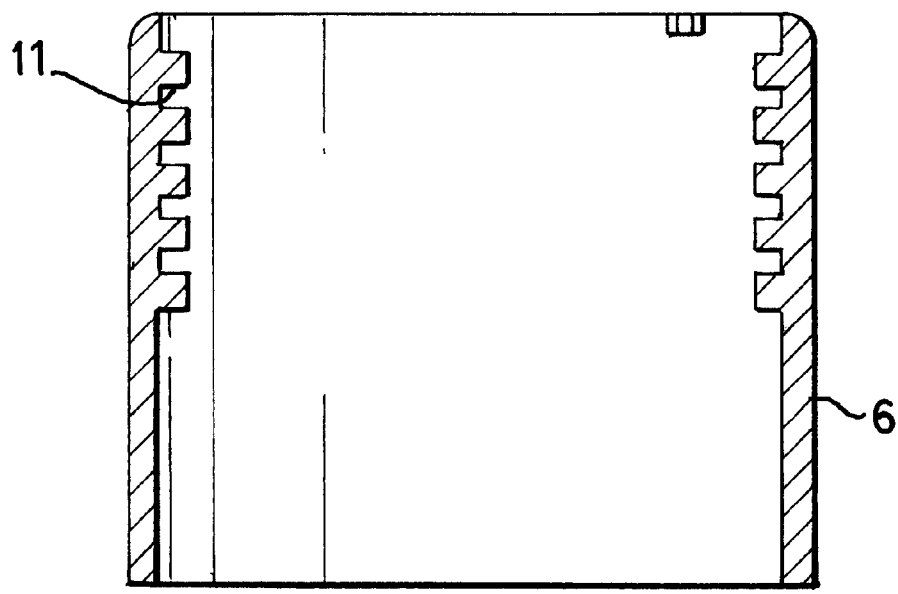
Figure 7A:
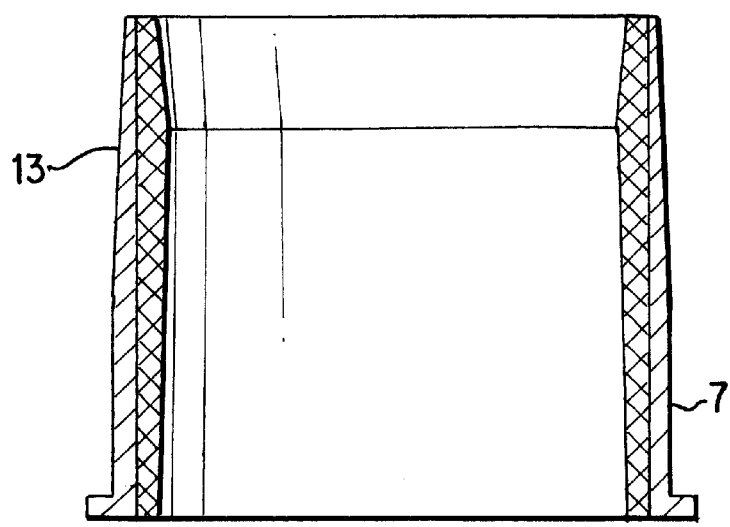
FIGS. 7a–7b, in a cross section view, show conical surfaces in a sealing arrangement according to the present invention.
Figure 7B:
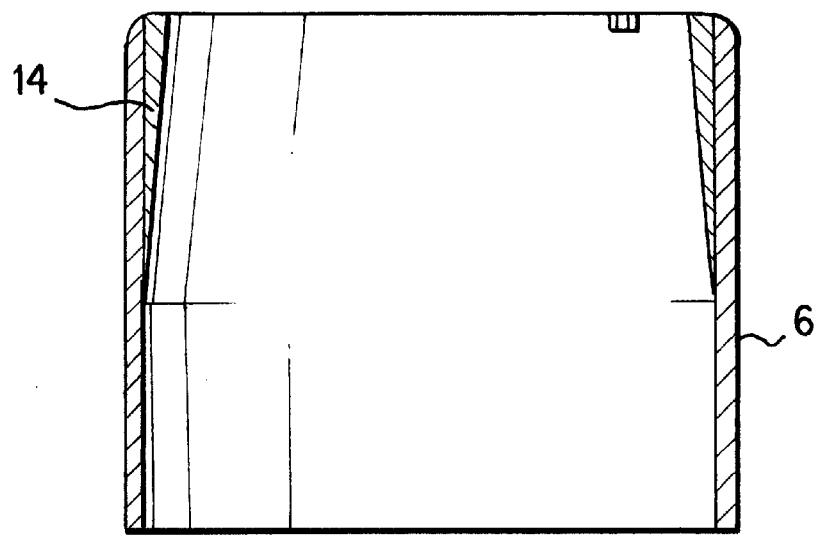

Sealing unit 9 surrounds steering column shaft 1 completely and is connected non-rotatably therewith. It consists of a supporting ring as well as a sealing jacket 8. The supporting ring in divided into (1) a sliding ring section 6 that is located externally and is in the form of an independent sliding ring; and (2) an internal clamping ring section 7 in the form of an independent clamping ring. The cylindrical outer surface of sliding ring 6, shown in detail in FIGS. 3 and 5, forms sliding surface 6a. Sliding ring 6 is made largely stiff and preferably of a polyacetal resin (POM) or polytetrafluoroethylene (PTFE) with favorable sliding and wear behavior. In a forward portion 6b, it has a conical internal contour that tapers toward the end of the ring as well as an internal thread 6c composed of four matching parts. The anterior outer edge of sliding ring 6 is also provided with an expanded radius 6d.

Figure 2:
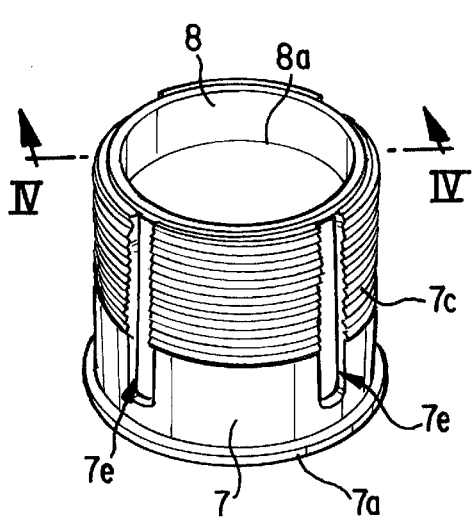
FIG. 2 shows, in a perspective view, a clamping ring of the sealing arrangement according to FIG. 1.
Figure 4:
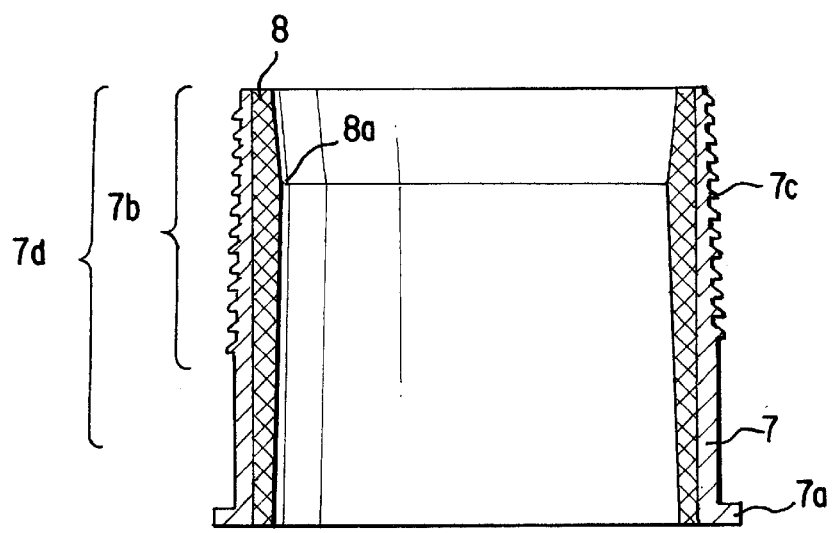
FIG. 4, in a cross section along line IV—IV, shows the clamping ring according to FIG. 2.

Sliding ring 6 is screwed onto the clamping ring 7 (shown in FIGS. 2 and 4). Clamping ring 7 has an external thread 7c that matches the internal thread 6c of the sliding ring. External thread 7c is located in a forward section 7b in which clamping ring 7 has a conical outer contour which the conical internal contour of sliding ring 6 fits. Clamping ring 7 also has an expanded elastically spreadable area 7d in which it is provided with lengthwise slots 7e. The elastically spreadable area 7d extends over a large part of the length of clamping ring 7 and merges in the other direction with a stiff section in which a rigid cylindrical flange 7a is provided on clamping ring 7. Flange 7a serves to stabilize the clamping ring and also as a stop surface for sliding ring 6 which has been screwed on. Clamping ring 7 preferably consists of a tough elastic plastic such as polypropylene (PP). Internally, clamping ring 7 has a cylindrical bore into which sealing jacket 8 made of a thermoplastic elastomer (TPE) is inserted. Sealing jacket 8 extends over the entire length of clamping ring 7 and is preferably connected materialwise with the clamping ring, especially by injection molding, vulcanization, or gluing. Sealing jacket 8 has an internal taper in a section that corresponds with elastically spreadable area 7d of clamping ring 7. The taper is formed by a wall thickness of the sealing jacket 8 that continuously increases from the ends of sealing jacket 8 to a top 8a.

To assemble the sealing unit 9 that consists of (1) sliding ring 6; (2) clamping ring 7; and (3) sealing jacket 8, first the part that consists of clamping ring 7 and sealing jacket 8 is pushed onto the profiled corrugated tube section 1b of steering column 1. The maximum diameter of corrugated tube section 1b roughly corresponds to the large inside diameter of sealing jacket 8. Therefore, clamping ring 7 and sealing jacket 8, because of the narrowed shape of sealing jacket 8 when pushed onto steering column shaft 1 and especially onto corrugated tube section 1b, is elastically expanded. When clamping ring 7 together with sealing jacket 8 is located in the correct position on steering column 1, sliding ring 6 is screwed onto clamping ring 7 so that the elastically spreadable area 7d of clamping ring 7 and sealing jacket 8 are squeezed together and pressed against steering column shaft 1. Sealing jacket 8 then engages the profiles of corrugated tube section 1b, so that it is correspondingly deformed and adjusts to the contour of the profile. Sliding ring 6 is screwed as far as necessary onto clamping ring 7. A self-locking thread 6c, 7c prevents spontaneous loosening of the screw connection. Then end area 4b of bellows 4 can be pushed over radius 6d onto sliding surface 6a, whereupon the sealing lips of bellows 4 can automatically assume their correct position as steering column 1 including sealing unit 9 is rotated.

The proposed sealing unit 9 can be mounted on steering column shafts 1 that have different profiles and tolerances of up to at least 1.5 mm. The sealing arrangements permit a complete seal between the steering column and bellows 4. Consequently, the passage of both material and sound are largely avoided. Sealing unit 9 can be mounted and demounted in simple fashion, possibly even by automation. With a suitable choice of material and low dimensional tolerances, noise between sealing unit 9 and bellows 4 can be largely avoided. With a satisfactory positioning of bellows 4 relative to sealing unit 9, the end area 4b automatically positions itself on sliding surface 6a when steering column 1 shaft is turned.

In a modified embodiment of the present invention, instead of thread 6c, 7c, a plurality of latching elements 11, 12 effective in at least the axial direction are provided between sliding ring 6 and clamping ring 7. These latching elements prevent loosening of the connection between the sliding ring and the clamping ring and hold the latter axially together.

In another modified embodiment of the present invention, the conical contact surfaces 13, 14 between sliding ring 6 and clamping ring 7 are designed so that when they are slid onto one another, a self-locking clamping connection is produced and a thread or latching elements between the sliding ring and the clamping ring can be eliminated. An external surface coating that exhibits favorable frictional properties can then be provided, especially on the side of the sliding ring.

In another modified embodiment of sealing arrangement 3, sealing jacket 8 is placed directly into sliding ring 6, and clamping ring 7 is eliminated.

In another modified embodiment, the sliding ring, clamping ring, and/or sealing jacket are made in two parts so that the ring in question can be clipped onto the steering column shaft.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A sealing arrangement for a shaft guided through a non-rotatable opening, wherein said shaft is mounted rotatably relative to the non-rotatable opening and has a profiled surface, comprising:

an elastic cuff mounted at the non-rotatable opening and surrounding the shaft, wherein said cuff abuts the shaft through a non-rotatable supporting ring having a cylindrical sliding surface on which the elastic cuff is mounted; and an elastic sealing jacket located inside the supporting ring, thereby connecting the supporting ring with the shaft.

2. A sealing arrangement according to claim 1, wherein said opening is a wall opening in a motor vehicle.

3. A sealing arrangement according to claim 1, wherein the supporting ring comprises:

a clamping ring section having an elastically-spreadable area and connected with the elastic sealing jacket; and a sliding ring section that is releasably connected with the clamping ring section and comprises the cylindrical sliding surface.

4. A sealing arrangement according to claim 3, wherein the clamping ring comprises one or more lengthwise slots.

5. A sealing arrangement according to claim 4, wherein said slots are in the elastically-spreadable area.

6. A sealing arrangement according to claim 4, wherein the elastic sealing jacket is permanently connected with the clamping ring section and has an internal constriction in a section corresponding to the elastically-spreadable area of clamping ring section.

7. A sealing arrangement according to claim 3, wherein the clamping ring section comprises a conical outer contour and the sliding ring section comprises a conical inside contour that matches the outside contour of the clamping ring section.

8. A sealing arrangement according to claim 7, wherein the conical outer contour is in the elastically-spreadable area.

9. A sealing arrangement according to claim 7, wherein the conical inside contour is in a section that corresponds to the elastically-spreadable area of clamping ring section.

10. A sealing arrangement according to claim 3, further comprising latching elements that engage one another axially located between the sliding ring section and the clamping ring section, thereby securing the sliding ring section and the clamping ring section axially against one another.

11. A sealing arrangement according to claim 10, wherein the latching elements comprise matching teeth.

12. A sealing arrangement according to claim 3, wherein the sliding ring section comprises an internal thread and the clamping ring section comprises a matching external thread.

13. A sealing arrangement according to claim 3, wherein the clamping ring section comprises a rigid annular flange.

14. A sealing arrangement according to claim 2, wherein the elastic cuff comprises a bellows that passes through a transverse wall between an engine compartment and a passenger compartment of a motor vehicle and encloses a shaft that forms part of a steering column.

15. A sealing arrangement according to claim 1, wherein said elastic jacket comprises a thermoplastic polymer.

16. A sealing arrangement, comprising:

a shaft guided through a non-rotatable opening, wherein said shaft is mounted rotatably relative to the non-rotatable opening and has a profiled surface;

an elastic cuff mounted at the non-rotatable opening and surrounding the shaft, wherein said cuff abuts the shaft through a non-rotatable supporting ring having a cylindrical sliding surface on which the elastic cuff is mounted; and an elastic sealing jacket located inside the supporting ring, thereby connecting the supporting ring with the shaft.

* * * * *